(12) United States Patent
Ogasa et al.

(10) Patent No.: US 6,329,316 B1
(45) Date of Patent: Dec. 11, 2001

(54) GRANULAR ACTIVE CARBON FOR NATURAL-GAS OCCLUSION AND PROCESS FOR PRODUCING THE SAME

(75) Inventors: Hiroshi Ogasa, Wako; Yusaku Sakata; Akinori Muto, both of Okayama, all of (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/239,801

(22) Filed: Jan. 29, 1999

(30) Foreign Application Priority Data

Jan. 29, 1998 (JP) .................................................. 10-017467

(51) Int. Cl.[7] .................................................. C01B 31/08
(52) U.S. Cl. .......................................... 502/416; 502/432
(58) Field of Search ...................................... 502/416, 432; 423/445 R (56) References Cited

U.S. PATENT DOCUMENTS

| 4,957,897 | * | 9/1990 | Maroldo et al. | ...................... 502/432 |
| 5,710,092 | * | 1/1998 | Baker | ................................... 502/416 |

* cited by examiner

Primary Examiner—Stuart L. Hendrickson (57) ABSTRACT

A granular active carbon for natural-gas occlusion is disclosed which can occlude natural gas at a relatively low pressure and has a high natural-gas occlusion capacity. The granular active carbon for natural-gas occlusion has first and second pores for the occlusion of constituent gas molecules of natural gas. The first pores each has a diameter $d_1$, satisfying $2d < d_1 \leq 2.5d$, while the second pores each has a diameter $d_2$ satisfying $5d < d_2 \leq 6d$, wherein d is the diameter of the constituent gas molecules.

11 Claims, 7 Drawing Sheets

GRANULAR ACTIVE CARBON FOR NATURAL-GAS OCCLUSION AND PROCESS FOR PRODUCING THE SAME

FIELD OF THE INVENTION

The present invention relates to a granular active carbon for natural-gas occlusion and a process for producing the same.

BACKGROUND OF THE INVENTION

In motor vehicles in which natural gas (main component: methane) is used as a fuel, the techniques employed for storing natural gas include a method of filling a vessel with compressed natural gas and a method of filling a vessel with liquefied natural gas.

However, the former technique has problems that the equipment cost is high because vessels are required to withstand a high pressure (about 20 MPa) and that poor suitability of the vessels in mounting on vehicles results in the reduction in the capacity, e.g., that of the trunk. On the other hand, the latter technique has problems that a vacuum double-wall vessel is necessary since liquefied natural gas should be kept at a very low temperature (−162° C.), and that an apparatus for vaporizing the liquefied natural gas is also necessary. As a result, the equipment cost in the latter technique is as high as in the former.

SUMMARY OF THE INVENTION

An object of the present invention is to provide a granular active carbon for natural-gas occlusion which can occlude natural gas at a relatively low pressure, has a high natural-gas occlusion capacity, and can bring about satisfactory suitability for mounting on vehicles, etc.

In order to accomplish the above object, the present invention provides a granular active carbon for natural-gas occlusion which has first and second pores for the occlusion of constituent gas molecules of natural gas, the first pores each having a diameter $d_1$, satisfying $2d < d_1 \leq 2.5d$ and the second pores each having a diameter $d_2$ satisfying $5d < d_2 \leq 6d$, wherein d is the diameter of the constituent gas molecules.

In the granular active carbon, many first pores are interconnected and are further connected to second pores.

The process of natural-gas occlusion under pressure proceeds by the following mechanisms. The first pores each function to rapidly adsorb constituent gas molecules of natural gas in such a manner that each adsorption site on the pore wall adsorbs two constituent gas molecules stacked up in a pore radius direction because of the above-described relationship between the two diameters d and $d_1$, i.e., a two-layer adsorption state appears. This is because the van der Waals force base on which a constituent gas molecule is adsorbed onto the pore wall extends through the adsorbed constituent gas molecule to another constituent gas molecule present nearby.

In the second pores, the two-layer adsorption state appears on the pore wall along the circumferential direction because of the above-described relationship between the two diameters d and $d_2$ and, simultaneously therewith, a passageway for transporting constituent gas molecules is formed at the center of each pore. Constituent gas molecules are led through these passageways to first pores and occluded therein.

The above-described occlusion of constituent gas molecules is conducted at a relatively low pressure, and the occlusion capacity is high. In addition, the granular active carbon can be packed into a vessel of any desired shape.

However, if the relationship between the two diameters d and $d_1$, is $d_1 \leq 2d$, the two-layer adsorption state described above cannot occur. On the other hand, if $d_1 > 2.5d$, the ability to adsorb constituent gas molecules onto pore walls is reduced. Furthermore, if the relationship between the two diameters d and $d_2$ is $d_2 \leq 5d$, the passageways described above cannot be formed. On the other hand, if $d_2 > 6d$, the ability to adsorb constituent gas molecules on pore walls is reduced.

Another object of the present invention is to provide a process by which the above-described granular active carbon for natural-gas occlusion can be mass-produced.

In order to accomplish the above object, the present invention provides a process for producing a granular active carbon for natural-gas occlusion which comprises subjecting a granular carbonized material to a gas activation treatment under the conditions that the holding temperature (T) is in the range of $900° C. \leq T \leq 1,000° C.$ and the holding time (t) is in the range of $4.7 h \leq t \leq 7.5 h.$ when a granular carbonized material is subjected to a gas activation treatment under those conditions, then first pores are formed by collisions of the gas against the granular carbonized material and second pores are formed as a result of diameter enlargement in part of the first pores. Thus, the granular active carbon for natural-gas occlusion can be mass-produced. Examples of the gas which can be used in the gas activation treatment include carbon dioxide, steam, and oxygen.

However, if the holding temperature is lower than 900° C. or if the holding time is shorter than 4.7 hours, a granular active carbon having the constitution described above cannot be obtained. On the other hand, if the holding temperature is elevated beyond 1,000° C. or if the holding time is prolonged beyond 7.5 hours, then the pore structure retention strength of the resultant granular active carbon drastically decreases and its adsorbing ability is considerably impaired.

DETAILED DESCRIPTION OF THE INVENTION

Figure 1:
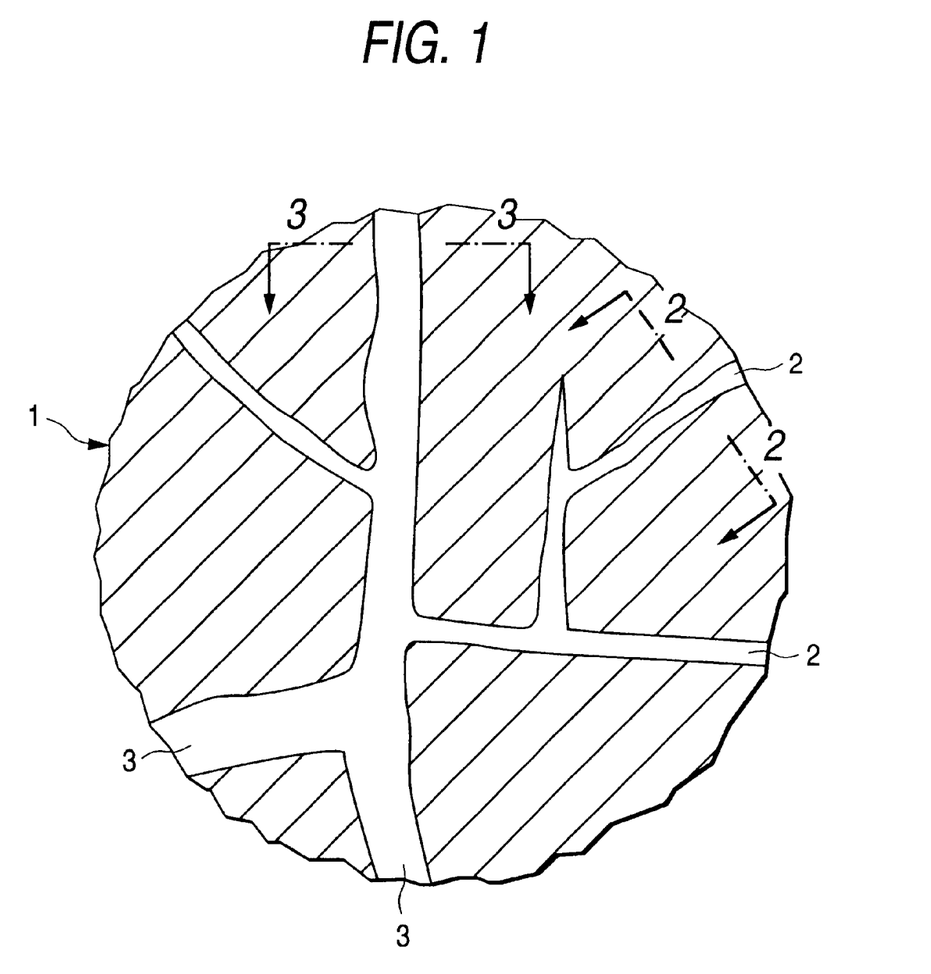
FIG. 1 is a view illustrating a granular active carbon.
Figure 2:
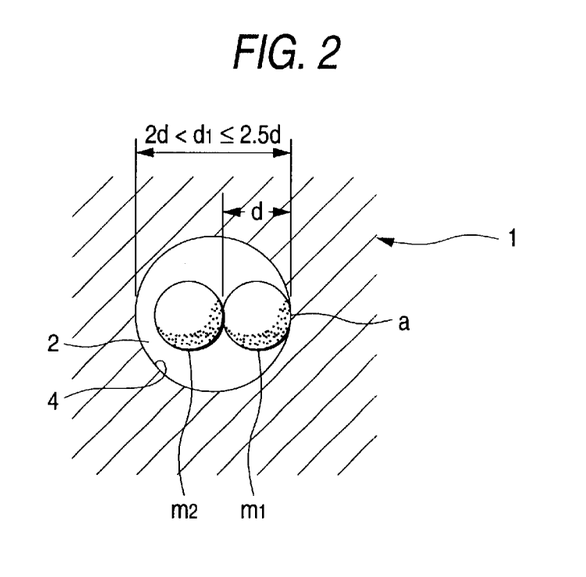
FIG. 2 is a sectional view taken on the line 2—2 of FIG. 1 and showing an occluded state of constituent gas molecules of natural gas.
Figure 3:
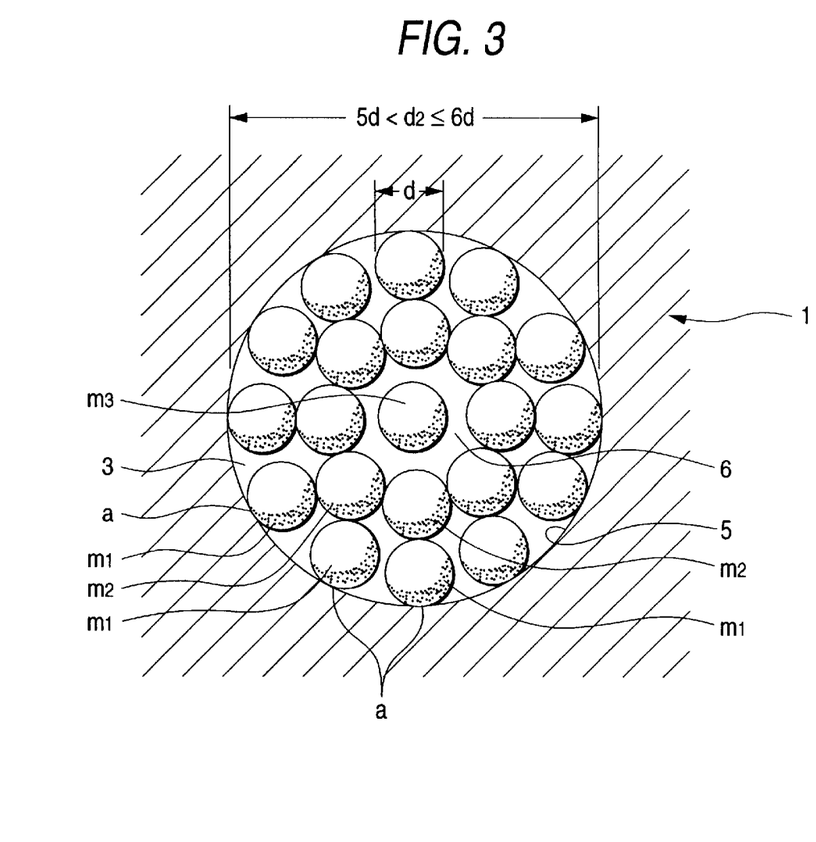
FIG. 3 is a sectional view taken on the line 3—3 of FIG. 1 and showing an occluded state of constituent gas molecules of natural gas.

The granular active carbon for natural-gas occlusion 1 shown in FIG. 1 has a diameter of about 1 mm and has first and second pores 2 and 3 so as to occlude methane molecules as constituent gas molecules of natural gas. As FIG. 2 shows, the diameter $d_1$ of each first pore 2 is regulated so that $2d<d_1 \leq 2.5d$, wherein d is the diameter of methane molecules $m_1$ and $m_2$. As FIG. 3 shows, the diameter $d_2$ of each second pore 3 is regulated so that $5d<d_2 \leq 6d$.

In the granular active carbon 1, many first pores 2 are interconnected and are connected also to second pores 3.

As clearly shown in FIG. 2, in the process of natural-gas occlusion under pressure, each first pore 2 functions to rapidly adsorb methane molecules $m_1$ and $m_2$ in such a manner that each adsorption site "a" on the pore wall 4 adsorbs the two methane molecules $m_1$ and $m_2$ stacked up in a pore radius direction because of the above-described relationship between the two diameters d and $d_1$, i.e., a two-layer adsorption state appears. This is because the van der Waals force based on which the methane molecule $m_1$ is adsorbed onto the pore wall 4 extends through the adsorbed methane molecule $m_1$ to the other methane molecule $m_2$ present nearby.

On the other hand, each second pore 3 functions in the following manner. As FIG. 3 clearly shows, the two-layer adsorption state appears on the pore wall 5 along the circumferential direction because of the above-described relationship between the two diameters d and $d_2$ and, simultaneously therewith, a passageway 6 for transporting methane molecules is formed at the center of the pore. A free methane molecule $m_3$ is led through the passageway 6 to a first pore 2 and occluded in the pore 2. The two-layer adsorption state in the second pore 3 includes a case in which two methane molecules $m_1$ and $m_1$ which have been adsorbed onto the pore wall 5 share one methane molecule $m_2$.

The above-described occlusion of methane molecules $m_1$ to $m_3$ is conducted at a relatively low pressure, and the occlusion capacity is high.

The proportion by volume (p) of the second pores 3 is preferably in the range of $5\% \leq p \leq 15\%$ based on the total volume of pores 2 and 3. If the proportion p is smaller than 5%, the above-described effect of second pores 3 cannot be obtained. On the other hand, if it exceeds 15%, the active carbon 1 has a reduced pore structure retention strength.

The volume of all pores contained in the active carbon of the present invention is preferably 1.500 cc/g or more. The total volume of the first and second pores is preferably 70% or more based on the volume of all pores contained in the active carbon.

EXAMPLES

Specific examples of the active carbon and process according to the present invention will be given below.

A. Production of Granular Active Carbons (a) A phenolic resin was compression-molded under the conditions of a compression pressure of 66 MPa and a holding time under compression of 3 minutes to obtain molded pellets each having a diameter of 13 mm, a thickness of 3 mm, and a weight of 0.5 g.

(b) The molded pellets were carbonized to obtain carbonized-material pellets made up of many granules of a carbonized material. The carbonization was conducted in an $N_2$ atmosphere under the conditions of a heating rate of 5° C./min, a holding temperature of 950° C., and a holding time of 1 hour.

(c) The carbonized-material pellets were subjected to a gas activation treatment to obtain active carbon pellets of Examples 1 to 7 each composed of many active carbon granules having a diameter of about 1 mm. The gas activation treatment was conducted using $CO_2$ as an activating gas under the conditions of a heating rate of 5° C./min, a holding temperature (T) of 950° C., and a holding time (t) of from 1 to 8 hours.

Subsequently, the granular active carbons of Examples 1 to 7 were subjected to pore distribution analysis by the DH (Dollimore and Heal)-MP method to determine the total volume of pores 2 and 3 in each granular active carbon and the proportion p of the volume of the second pores 3 in that total volume.

Figure 4:
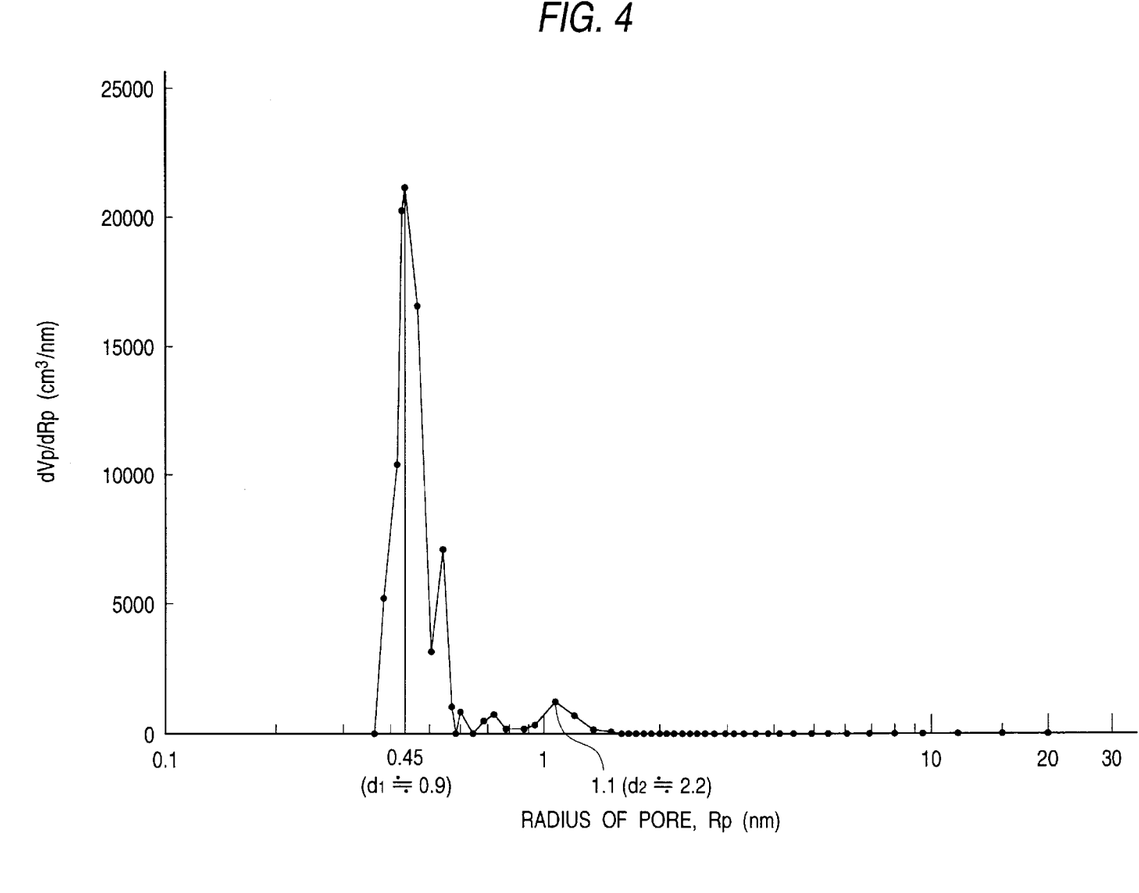
FIG. 4 is a graph showing the results of a pore distribution analysis of Example 4.

FIG. 4 shows the results of the pore distribution analysis of the granular active carbon of Example 4. It can be seen from FIG. 4 that the granular active carbon had first pores 2 each having a diameter $d_1$, of about 0.9 nm and second pores 3 each having a diameter $d_2$ of about 2.2 nm. The diameter of a methane molecule is about 0.39 nm. In FIG. 4, dVp/dRp means the change of pore volume Vp with pore radius Rp.

Figure 5:
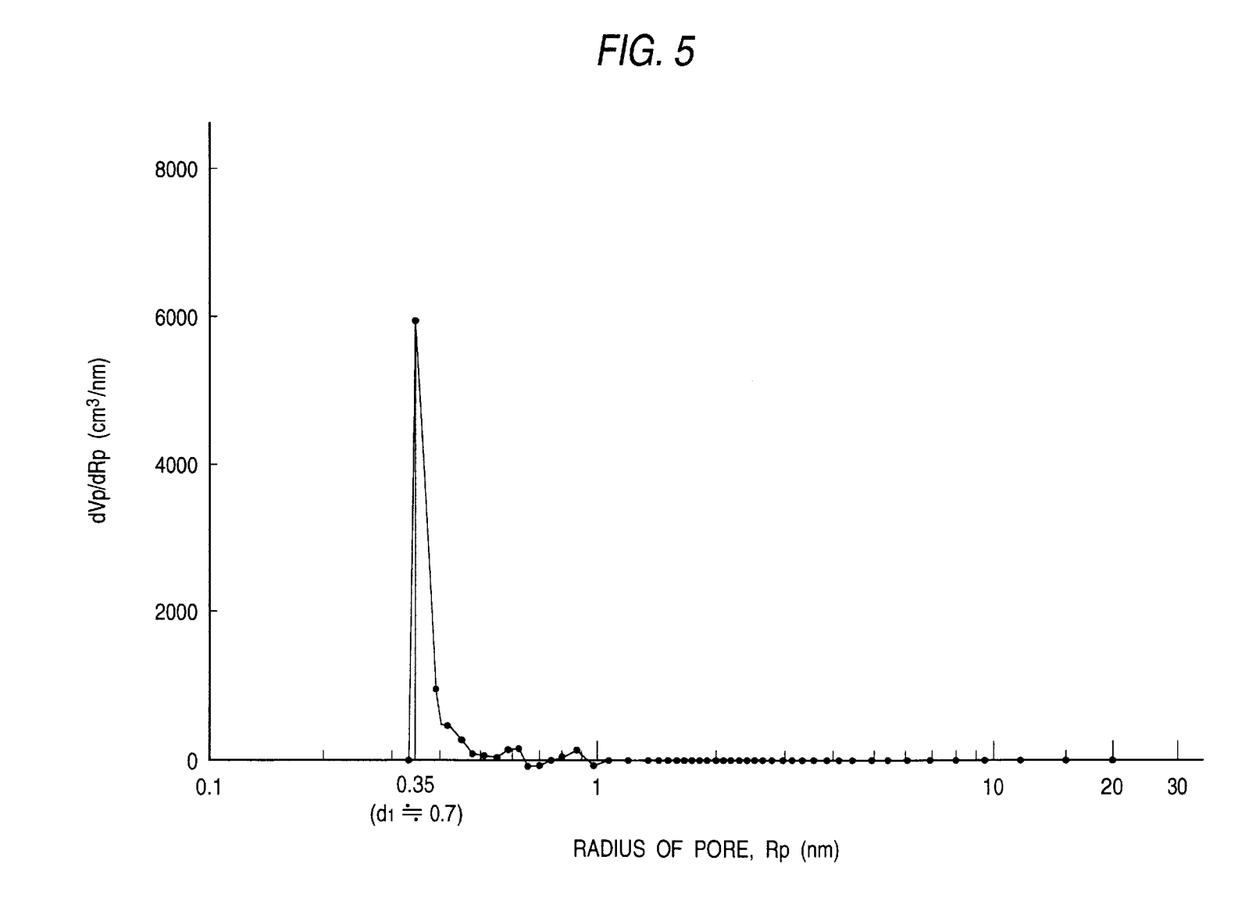
FIG. 5 is a graph showing the results of a pore distribution analysis of Example 1.
Figure 6:
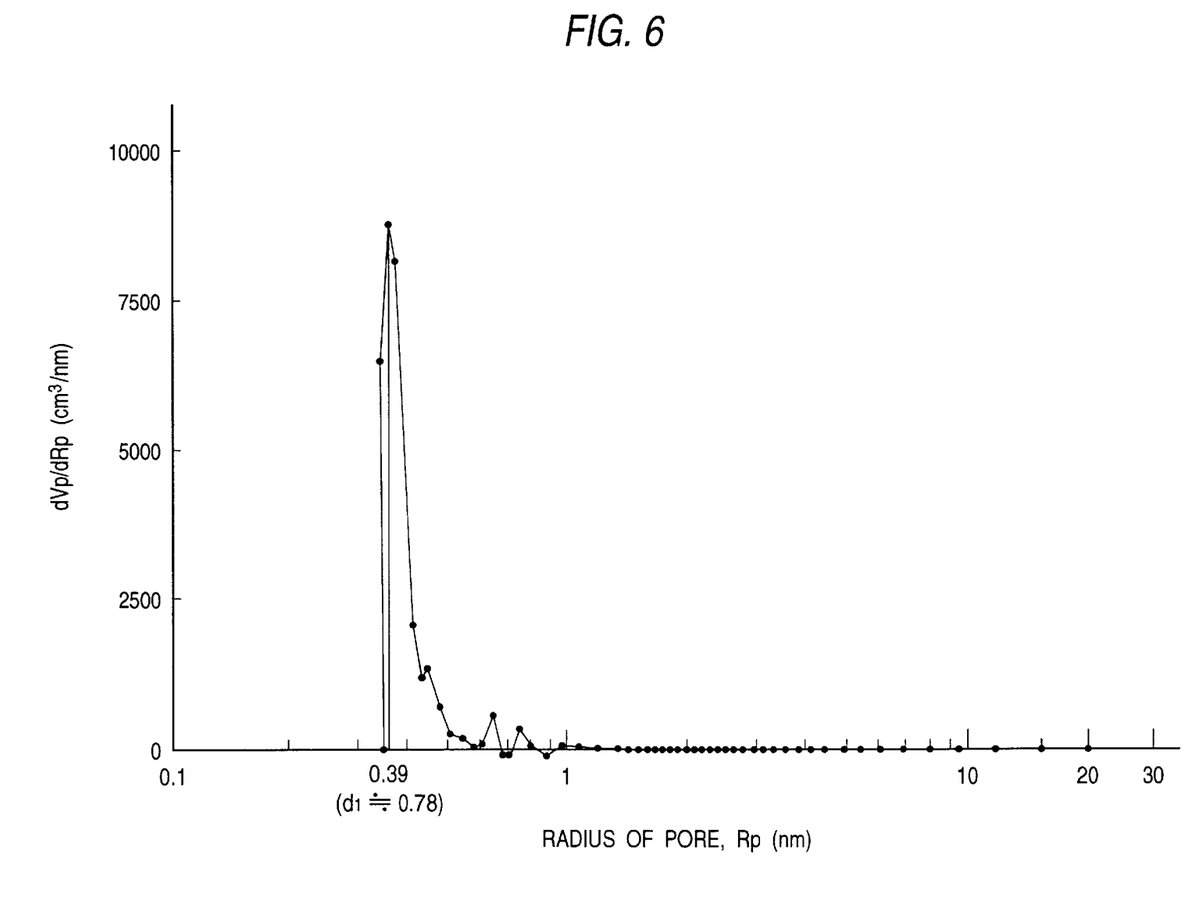
FIG. 6 is a graph showing the results of a pore distribution analysis of Example 2.

FIGS. 5 and 6 show the results of the pore distribution analyses of the granular active carbons of Examples 1 and 2, respectively. The graphs given in FIGS. 5 and 6 had no peak on the larger-pore-radius side of 1 nm. This means that second pores such as those described above were not present in these granular active carbons.

The granular active carbons of Examples 1 to 7 were further subjected to BET analysis to determine the specific surface area each granular active carbon. Furthermore, a vibration test conducted under the conditions of 2 G and 15 Hz to determine pore structure retention strength of each granular active carbon.

Table 1 shows the holding time (t) in the gas activation treatment in producing each of the granular active carbons of Examples 1 to 7, and the volume of all pores, proportion by volume of second pores, specific surface area, and pore structure retention strength of each granular active carbon. For the purpose of comparison, data on the carbonized-material pellets are also given in Table 1. The granular active carbons of Examples 3 to 6 are inventive examples.

TABLE 1

| | | Granular Active Carbon | | | |
|---|---|---|---|---|---|
| Active Carbon Pellets | Holding Time, t (h) | Volume Of All Pores (cc/g) | Propotion of Second Pores, p (%) | Specific Surface Area (m²/g) | Pore Structure Retention Strength (cycles) |
| Example 1 | 1 | 0.451 | —* | 1050 | 280000 |
| Example 2 | 3 | 0.840 | —* | 1930 | 68000 |
| Example 3 | 5 | 1.540 | 7 | 2860 | 7400 |
| Example 4 | 6 | 1.732 | 13 | 3160 | 4050 |
| Example 5 | 7 | 1.730 | 14 | 3100 | 3300 |
| Example 6 | 7.5 | 1.700 | 15 | 2950 | 900 |
| Example 7 | 8 | 0.950 | —* | 2300 | 200 |
| Carbonized Material Pellets | — | 0.261 | —* | 610 | 1 × 10⁶ |

*The samples had no second pore.

B. Occlusion of Methane Molecules

The occlusion of methane molecules was effected with the granular active carbons of Examples 1 to 7 under the conditions of an occlusion pressure of 3.5 MPa and an occlusion temperature of 35° C. The obtained results are shown in Table 2, along with those of the carbonized-material pellets for comparison.

TABLE 2

| Active Carbon Pellets | Methane Occlusion Capacity (cm³/g) |
| --- | --- |
| Example 1 | 94 |
| Example 2 | 122 |
| Example 3 | 158 |
| Example 4 | 228 |
| Example 5 | 161 |
| Example 6 | 150 |
| Example 7 | 125 |
| Carbonized-material Pellets | 91 |

Figure 7:
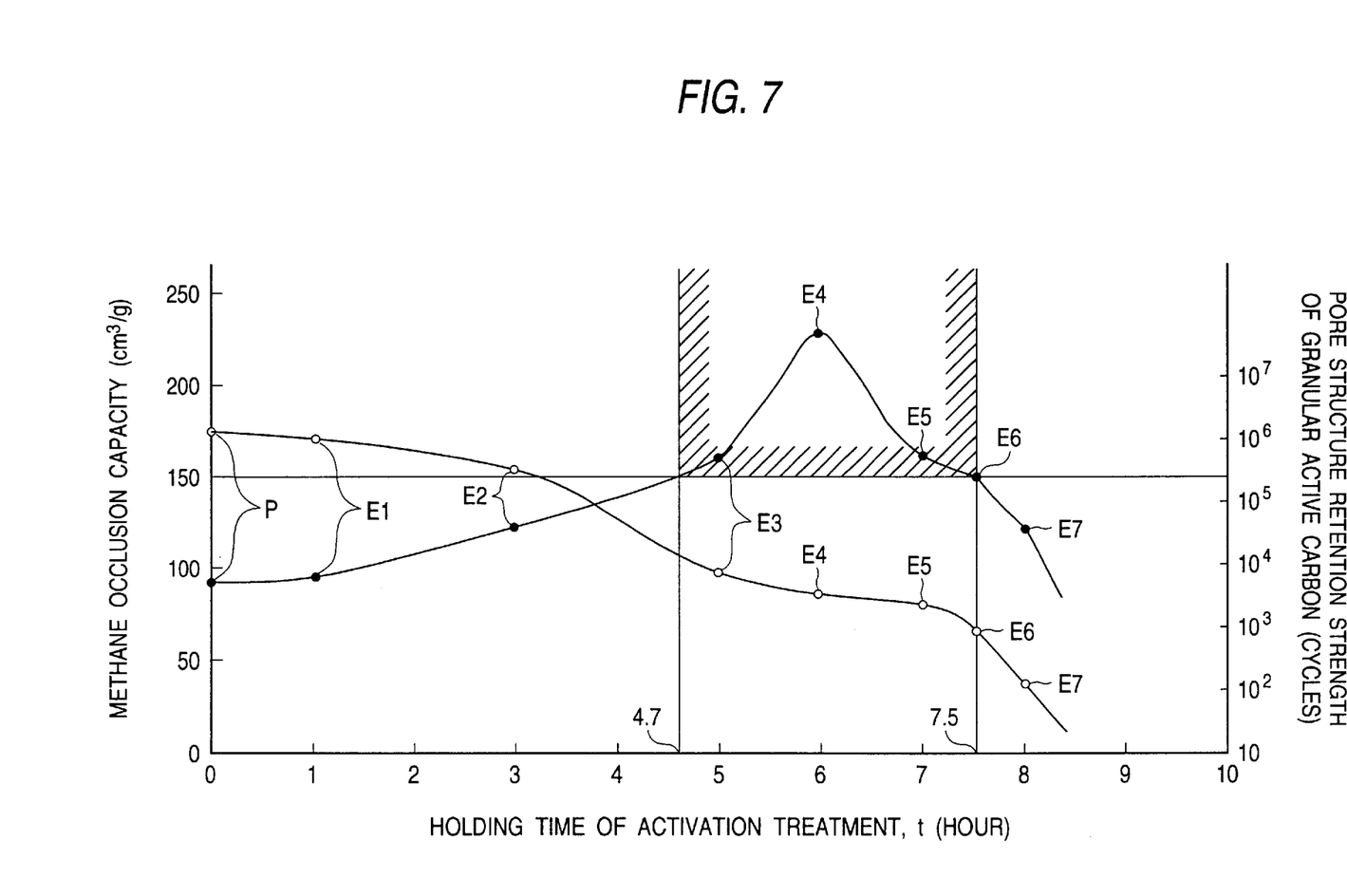
FIG. 7 is a graphic presentation showing the relationship between holding time (t) in an activation treatment and each of methane occlusion capacity and the pore structure retention strength of the granular active carbon.

FIG. 7 is a graphic presentation based on results given in Tables 1 and 2 which shows the relationship, in Examples 1 to 7 (E1 to E7) and the carbonized-material pellets (P), between the holding time t in the activation treatment and each of the methane occlusion capacity (black circles) and the pore structure retention strength of the granular active carbon (white circles). It can be seen from FIG. 7 that Examples 3 to 6, for which the holding time t had been regulated to the range of $4.7\ h \leq t \leq 7.5\ h$, not only satisfied a methane occlusion capacity of 150 cm³/g or higher, which is considered to be necessary for practical use, but also were satisfactory in pore structure retention strength.

Figure 8:
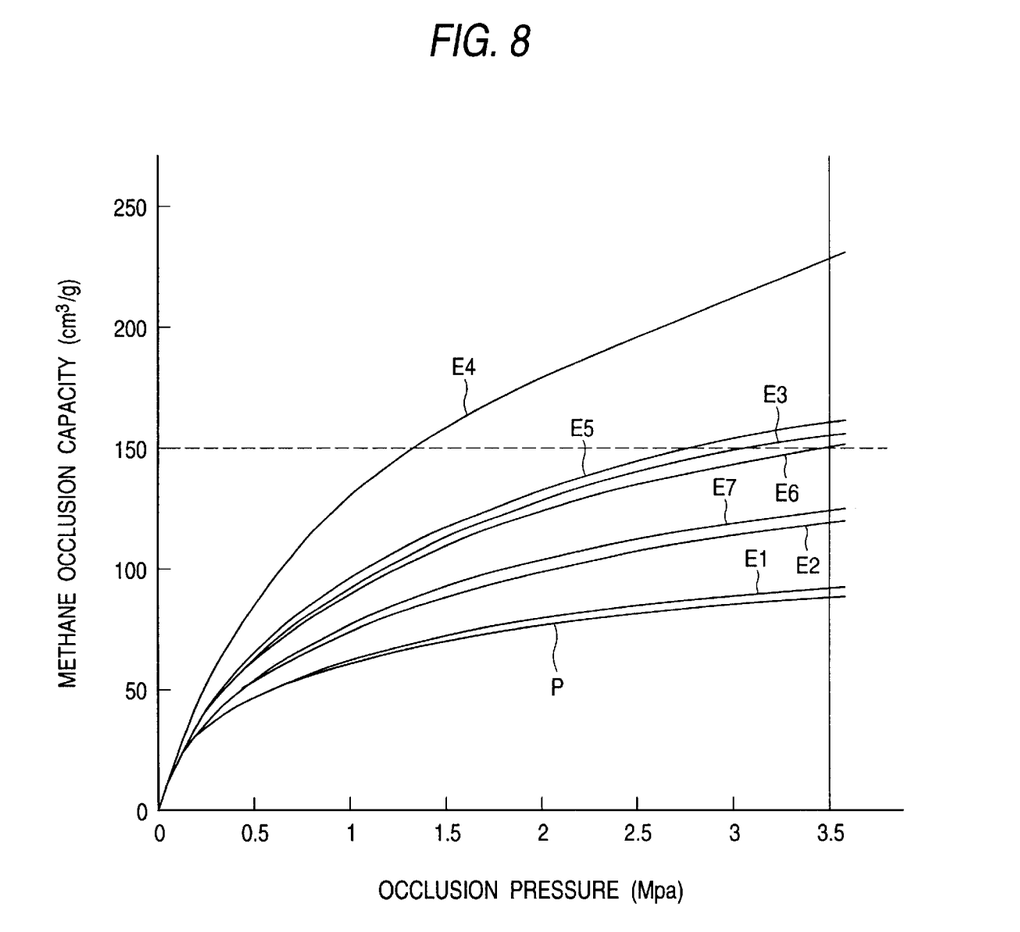
FIG. 8 is a graphic presentation showing the relationship between occlusion pressure and methane occlusion capacity.

Subsequently, the occlusion of methane molecules was effected with each of the granular active carbons of Examples 1 to 7 (E1 to E7) at a constant occlusion temperature of 35° C. while changing the occlusion pressure to determine the relationship between occlusion pressure and methane occlusion capacity. The obtained results are shown in FIG. 8, along with those of the carbonized-material pellets for comparison (P). It can be seen from FIG. 8 that the granular active carbons of Examples 3 to 6 satisfied the methane occlusion capacity of 150 cm³/g at occlusion pressures of 3.5 MPa and lower.

According to the present invention, a granular active carbon for natural-gas occlusion can be provided which, due to the constitution described above, can occlude natural gas at a relatively low pressure and has a high natural-gas occlusion capacity and satisfactory suitability for mounting on vehicles, etc.

Furthermore, according to the present invention, a process can be provided by which the granular active carbon having the excellent properties described above can be mass-produced.

While the invention has been described in detail and with reference to specific embodiments thereof, it will be apparent to one skilled in the art that various changes and modifications can be made therein with out departing from the spirit and scope thereof.

What is claimed is:

1. A granular active carbon for natural-gas occlusion which has first and second pores for the occlusion of constituent gas molecules of natural gas, said first pores (2) each having a diameter d1 satisfying $2d<d\leq 2.5d$ and said second pores (3) each having a diameter d2 satisfying $5d<d2\leq 6d$, wherein d is the diameter of methane molecules and a proportion by volume p of the second pores is in the range of $5\% \leq d_2 \leq 15\%$ based on the total volume of the first and second pores.

2. The granular active carbon for natural gas occlusion according to claim 1, wherein at least two of said first pores are interconnected.

3. The granular active carbon for natural gas occlusion according to claim 1, wherein at least two of said first pores are interconnected and are also connected to at least one of said second pores.

4. The granular active carbon for natural gas occlusion according to claim 1, wherein an aggregate volume of said first and said second pores is 70 percent or more of a total volume consisting of said first pores, said second pores and any remaining pores in said granular active carbon.

5. The granular active carbon for natural gas occlusion according to claim 1, wherein said granular active carbon has a methane occlusion capacity of 150 cm3/g at occlusion pressures of 3.5 MPa and lower.

6. The granular active carbon for natural gas occlusion according to claim 1, wherein said granular active carbon has a pore structure retention strength of at least 900 cycles at 15 Hz and 2 G.

7. The granular active carbon for natural gas occlusion according to claim 1, wherein said first pores are for occlusion of natural gas molecules and said second pores serve as passageways and for occlusion of natural gas molecules.

8. A process for producing a granular active carbon for natural-gas occlusion of claim 1 which comprises subjecting a granular carbonized material to a gas activation treatment under the conditions that the holding temperature T is in the range of $9.00°\ C. \leq T \leq 1,000°\ C.$ and the holding time t is in the range of $4.7\ h \leq t \leq 7.5\ h$.

9. The process of claim 8, wherein the granular carbonized material is one prepared by carbonizing a phenolic resin.

10. The process of claim 8, wherein $CO_2$ is used as an activating gas.

11. A granular active carbon for natural-gas occlusion which has first and second pores for the occlusion of constituent gas molecules of natural gas, said first pores (2) each having a diameter d1 satisfying $2d<d\leq 2.5d$ and said second pores (3) each having a diameter d2 satisfying $5d<d2\leq 6d$, wherein d is the diameter of methane molecules and an aggregate volume of said first and said second pores is 70 percent or more of a total volume consisting of said first pores, said second pores and any remaining pores in said granular active carbon, and said aggregate volume is 1.5 cc/g or more.

* * * * *